United States Patent [19]

Boebert et al.

[11] Patent Number: 4,713,753
[45] Date of Patent: Dec. 15, 1987

[54] SECURE DATA PROCESSING SYSTEM ARCHITECTURE WITH FORMAT CONTROL

[75] Inventors: William E. Boebert; Richard Y. Kain, both of Minneapolis, Minn.

[73] Assignee: Honeywell Inc., Minneapolis, Minn.

[21] Appl. No.: 703,638

[22] Filed: Feb. 21, 1985

[51] Int. Cl.$^4$ .......................... G06F 1/00; H04L 9/00
[52] U.S. Cl. .............................. 364/200; 340/825.34; 380/4; 380/25
[58] Field of Search ... 364/200 MS File, 900 MS File, 364/300; 178/22.08

[56] References Cited

U.S. PATENT DOCUMENTS 4,104,721  8/1979  Markstein et al. ................... 364/200
4,621,321  11/1986  Boebert et al. ...................... 364/200

Primary Examiner—Raulfe B. Zache
Attorney, Agent, or Firm—John G. Shudy, Jr.

[57] ABSTRACT

Means and methods of securing protected system files in a data processing system are disclosed, wherein the information determining access rights of system users to the protected systems files remains at all times within a secure processor. Provision is also made for allowing the display or labeling of protected data files only when markings consistent with the security level of such files are also displayed or included in the label. Furthermore, provision is also made for limiting the access rights of users to protected system files based on a comparison between the formats associated with said files and the function or subsystem performing operations on behalf of the users.

17 Claims, 9 Drawing Figures

SECURE DATA PROCESSING SYSTEM ARCHITECTURE WITH FORMAT CONTROL

The present invention was developed in conjunction with the United States Government Contract No. MDA 904-84-C-6011.

BACKGROUND OF THE INVENTION

1. Field of the Invention

This invention relates generally to data processing systems which possess system files. Such files can be viewed as consisting of one or more segments, which in turn consist of fields, wherein segments, data objects, and fields are logical aggregates of information which may have a variety of physical manifestations including the format of the data. This invention relates particularly to secure data processing systems, in which access or manipulation of data objects, and the labeling and display of data objects can be performed only by programs executing on behalf of user entities which possess authorization and only by programs which are permitted to perform specific tasks. Authorization is determined by a security policy, which includes a set of pre-existing relationship that exist between security attributes associated, at the time access or manipulation is attempted, with the aforesaid user entities and data objects. Such security attributes can, for example, represent the degree of sensitivity of information contained in the data object with which one security attribute is associated and the degree of trustworthiness of a user entity with which a second security attribute is associated. Those tasks which a program are permitted to perform are also determined by the security policy, by having the policy include a set of pre-existing relationships that exist between programs or groups of programs (i.e., subsystems) which perform the tasks, the formats of the data objects that those programs (or groups of programs) may access, and the modes of access to the aforesaid data objects. A security policy, and a secure data processing system which enforces it, can be used in this case to mandate that sensitive information is accessed or manipulated only by appropriate programs executed on behalf of user entities which possess sufficient trustworthiness.

2. Description of the Related Art

It is known in related art to provide means whereby the modes or manners in which a program can access or manipulate a data object can be restricted to a fixed set, as for example, permitting or denying of the ability to read (access) information, write (enter) information, and/or other modes singly and in combination. An instance of such a set shall be referred to herein as an access right. In this techinique, access rights are granted by programs for data objects under their control, by setting values of fields within distinguished data objects, said distinguished data objects being differentiated from ordinary ones by being located within distinguished segments. The distanguished data objects are fetched by the data processing system prior to access or manipulation, and the data processing system will only perform the access or manipulations permitted by the contents of their access rights fields. The above technique suffers from two weaknesses. First, the existence of distinguished segments adds complication to the programs executed by the data processing system, because the programs must treat distinguished and ordinary segments in different ways. Second, programs are permitted to grant access without regard for the user entity on whose behalf the program is being executed, or any security attributes currently possessed by said user entity. Thus a user entity may execute a program which grants an access right to another program executing on behalf of said user entity, which access right is not authorized by pre-existing security policy. It is further known within related art to permit only highly trusted programs to grant access rights. When a program executing on behalf of a given user entity wishes a given access right to a given ordinary data object, said program invokes the highly trusted program, which obtains the current security attributes associated with the given user entity and the given ordinary data object and insures that an access right is granted which is authorized by the security policy. The above technique suffers from the weakness that the compromise of software programs, such as the highly trusted program described above, is known to be relatively easy to accomplish, such compromise can go undetected, and demonstration that a program has not been compromised is known to be extremely difficult.

It is still further known in related art to provide apparatus which is capable of recognizing distinguished data objects, thereby permitting the mixing of distinguished and ordinary data objects within segments, and to restrict the setting of access rights to highly trusted programs in the manner described above. This technique suffers from two weaknesses. First, the highly trusted program is subject to compromise as described above. Second, even if the highly trusted program is not compromised, a program executing on behalf of one user entity may establish an access right to some ordinary data object, which access right is unauthorized according to security policy. Such compromise is effected by having the program obtain a distinguished data object which grants an access right to a given ordinary data object, said access right being authorized by security policy, and then having the program place said distinguished data object in a segment which can be accessed by a program executing on behalf of a second user entity, which second user entity has current security attributes different from the first user entity, and which second user entity security attributes do not authorize, according to security policy, the access right thereby obtained.

It is yet further known in the related art to provide, in addition to the mixing of distinguished and ordinary data objects in segments, and in addition to the providing of highly trusted software to set the values of distinguished data objects in the manner described above, apparatus which restricts the placement of distainguished data objects to segments which are accessed in common only by programs executing on behalf of user entities whose possible security attributes would authorize, according to security policy, the access rights granted by such distinguished data objects. The above technique suffers from three weaknesses. First, the highly trusted software is subject to compromise as described above. Second, the restriction on the storage of distinguished data objects limits the activity of programs executing on behalf of user entities, and thereby reduces the effectiveness and efficiency of those programs. Third, the consequences of a malfunction in the apparatus which enforces such restriction is catastrophic, in that once a distinguished data object is placed in a segment to which access is freely shared, said distinguished data object can be moved and copied among segments in the data processing system in a manner impossible to trace and reverse.

All of the aforementioned techniques suffer from the additional weakness that a malicious user entity may place in the system a program which can be executed on the behalf of an unsuspecting user entity. The malicious program may then use the access rights authorized to the unsuspecting user entity to copy information in a manner such that the malicious user entity would, in effect, obtain unauthorized access to data objects and such copying would not be detected by said unsuspecting user entity.

It is still further known in the related art to permit only highly trusted programs to access system files, and to require that programs executing on behalf of user entities invoke said highly trusted program upon each attempt to access system files. This technique suffers from three weaknesses. First, the highly trusted program is subject to compromise as described above, and the demonstration that the program has not been compromised is virtually impossible, owing to the number of functions performed by the program. Second, even if the highly trusted program is not subject to compromise, it is extermely difficult to demonstrate that access to system files cannot be gained by means outside said highly trusted program. Third, the use of an intermediary program to perform accesses to system files severely degrades the performance of the programs which execute on behalf of user entities.

It is yet further known in the related art to permit users to store a distinguished data object describing a segment within other segments, the distinguished data object containing access rights information, and to permit users to retrieve the distinguished data object and subsequently to access the contents of the described segment in accordance with the access rights information retrieved from the distinguished data object. The above technique suffers from the weakness that since the user's access rights for a segment are determined when the distinguished data object is constructed, that user's access rights cannot effectively be revoked if the user can retain obsolete access rights for use after revocation.

A further weakness of these prior techniques is that one authorized by the security policy to access a data object may output such data in an unmarked format, then use or copy the data in contravention of the security status of the data.

SUMMARY

In is therefore an object of the present invention to provide an architecture for a data processing system which is secure in the sense defined above.

It is a further object of the present invention to provide said security without recourse to or reliance upon highly trusted complex software programs.

It is still another object of the present invention to provide apparatus which associates security attributes with user entities and data objects and which permits those security attributes to vary in a controlled manner over time.

It is yet another object of the present invention to provide apparatus which guarantees that programs executing on behalf of a user entity can exercise only those access rights which are consistent with limits set by a predetermined security policy.

It is a still further object of the present invention to provide apparatus which guarantees that no program executing on behalf of a given user entity can, by abusing access rights to data objects, perform operations unauthorized by a predefined security policy.

It is a yet further object to accomplish the aforementioned objects using techniques which require minimal changes to software and programming practices in order for said software and programming practices to result in secure processing, by providing techniques which are extensions of and not restrictions to the techniques provided by nonsecure computer architectures.

It is a further object of the invention to provide a data processing system wherein data output therefrom is displayed and labelled only in a manner consistent with the sensitivity of the data and the nature of the data display device.

It is a further object of the invention to provide a data processing system wherein a user cannot retain obsolete access rights to protected system files or data.

The aforementioned and other objects of the present invention are accomplished by including within the data processing system apparatus which can recognize distinguished data objects within segments of the system files. Each said distinguished data object denotes a single data object. Before a program can access or manipulate a given data object in a given mode or manner, said program must make available to said apparatus a distinguished data object, the value of which denotes the given data object. Said apparatus will permit segments to contain both distinguished data objects and ordinary ones, and will impose no restrictions on which segments can contain distinguished data objects, other than those restrictions imposed by programs using the techniques provided by distinguished data objects. Said apparatus will permit the display of labeled data objects only in a manner consistent with the security level of the data object and the nature of the display device on which the data object is displayed. Said apparatus will protect distinguished data objects from compromise or examination by restricting the operations which may be performed on them. Said apparatus will use the following technique to insure that a program executing on behalf of a given user entity cannot use distinguished data objects to directly or indirectly access or manipulate ordinary data objects in modes or manners which are unauthorized by a pre-existing security policy: the apparatus will associate a specific instance of security attributes with each data object. Such a specific instance shall be referred to herein as the security level of the data object. The apparatus will maintain at all times the security attributes associated with the user entity on whose behalf the data processing system is currently executing a program. An instance of such security attributes in effect at the time an access or manipulation is to be performed by a program shall be referred to herein as the current security context of the program. Access rights to protected system files or data will be retained at all times within a secure processor which can have data therein altered only by a director entity of the data processing system. The apparatus will only permit a program to access, manipulate, display or label the data object denoted by a distinguished data object in the mode or manner defined by the pre-existing security policy for this specific combination of program security context and data object security level. As a result, no program ever executed on behalf of a given user entity can, either directly or indirectly, access, manipulate, display or label information contained in a data object in a manner or mode which is not authorized by the pre-existing security policy.

Distinguished data objects may be included in segments that are shared between processors, either along secure transmission links or in an encrypted form, thereby providing uniformity of control of access by user entities on all data processing units in a distributed system.

These and other features of the invention will be understood upon reading of the following description along with the drawings.

DESCRIPTION OF THE PREFERRED EMBODIMENT

In all diagrams, detailed element numbers can refer to elements of previous drawings.

Figure 1:
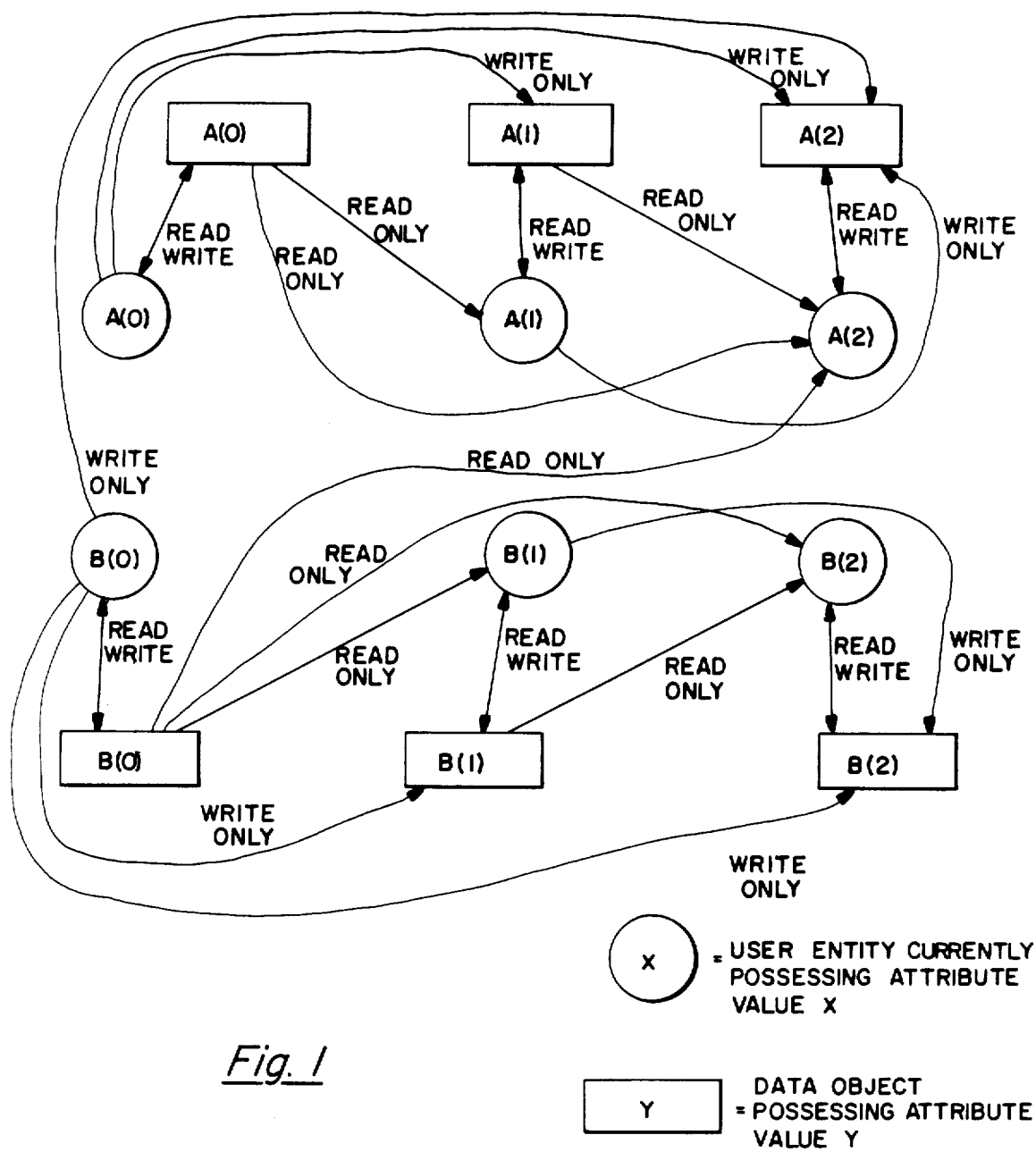
FIG. 1 is a diagram illustrating how restrictions on the flow of information can be mandated by a security policy which associates security attributes with user entities and data objects and controls modes and manners of access and manipulation by relationships between said attributes.

Referring now to FIG. 1, the manner in which the flow of information between user entities can be controlled by the level portions of the security attributes associated with the user entities and the data objects manipulated or accessed by those entities is illustrated. The level portions of the security attributes in this example are partially ordered: A(2) is defined to be greater than A(1) which is defined to be greater than A(0), B(2) is defined to be greater than B(1) which is defined to be greater than B(0), A(2) is defined to be greater than B(0), each attribute is defined to be equal to itself, and no other relations exist between the level portions of the attributes. The predefined security policy is that a user entity may read (retrieve) information from a data object if and only if the current value in the level portion of the security attribute of the user entity is greater than or equal to the level portion of the security attribute of the data object, and a user entity may write (enter) information into a data object if and only if the level portion of the security attribute of the data object is greater than or equal to the level portion of the security attribute currently associated with the user entity. As indicated in the diagram, and with relation to user entities communicating by means of data objects contained within system files in the memory unit of computers, memory space is available to any data processing user entity. Any user entity can access or manipulate any data object to which a connecting line exists in the diagram, in the mode or manner shown on the label attached to the line. The lines accordingly define all the possible directional paths along which information can flow from user entity to user entity, given the example security attributes. Thus one-way communication is possible from A(0) and A(1) to A(2), from B(0) and B(1) to B(2), and from B(0) to A(2), in many cases through a variety of data objects. In such a manner arbitrary information flows between user entities may be controlled in a manner not restricted to rigid relations between those user entities, such as strict hierarchical ordering. As an example, in modern corporate practice, the B(n) set of data objects could contain financial data of increasing sensitivity and the A(n) set of data objects could contain production data of increasing sensitivity. Likewise, the B(n) set of user entities could be members of the financial staff of increasing rank and privilege and the A(n) set similarly members of the production staff. The information flow controls in the example diagram show a circumstance wherein information flows upwards only within each staff, the highest ranking member of the production staff is able to examine but not alter low-sensitivity financial data such as individual invoices, no other members of the production staff have any access whatever to any financial data, and no members of the financial staff, no matter how high ranking, have the ability to read production information. It will be clear that the information flow restrictions are enforced solely by permitting or prohibiting operations based on a comparison of the current security attributes of a user entity and those of a data object. Thus if a user entity has a security attribute A(0) at the time access is attempted to a data object with security attribute B(n), a comparison of attributes will yield a result of non-compatibility. It will also be clear that although FIG. 1 represents data objects as distinct entities, in general, the data objects may be located anywhere within physical media.

Figure 1A:
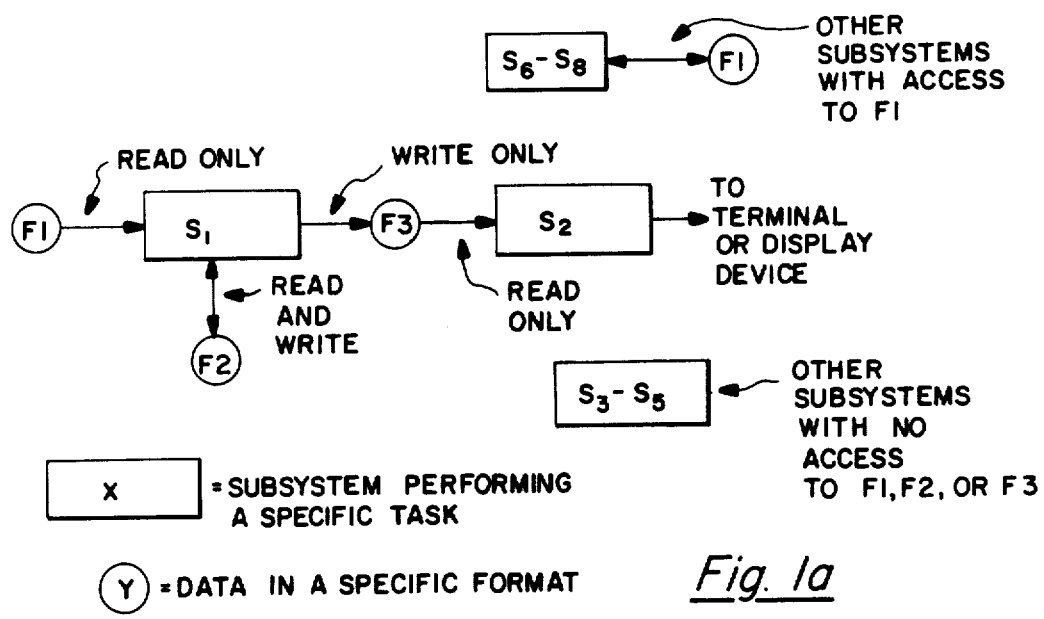
FIG. 1A is a diagram illustrating how restrictions on access to information can be mandated by an additional security policy which governs the manner in which specific subsystems may access information stored in specific formats.

Referring now to FIG. 1A, the manner in which access to information of specific format may be limited to subsystems performing specific tasks is illustrated. In this example, F1, F2, and F3 are sets of data objects, each set having a specific internal format; S1 and S2 are subsystems, comprised of hardware and software working in concert to perform a specific task. As indicated in the diagram, data in format F1 is generally available to numerous subsystems including S1 and S6; data in format F2 may only be manipulated by subsystem S1; and data in format F3 may only be used to communicate between subsystem S1 and subsystem S2.

Thus format F1 may be the generally used format for data within the machine, such as encoded strings of characters. Format F2 may be the format of information which must remain incorruptible, such as the strings of characters (e.g., TOP SECRET, PROPRIETARY, etc.) used to mark output from the computer when it is displayed or produced in human-readable form, and tables which define what information must be marked in which manner. Format F3 may be ordinary information which is properly marked and formatted for display.

Subsystem S1 would then be a subsystem whose task is to determine the proper marking and insert it in the proper location in the data as part of the task of formatting the data for output. Subsystem S2 would be a subsystem whose task it is to display the data on some appropriate device.

It will be clear that the access restrictions shown in the example prevent malicious programs from subverting the intent of a predefined security policy by altering the markings on information when it is displayed, e.g., by altering "PROPRIETARY" to "RELEASED FOR PUBLIC DISTRIBUTION." Subsystems S1 and S2 will have been shown to be free from malicious intent by a process of stringent examination and test. It will be clear to anyone well-versed in the art of computer system design that such a proof of a restricted property is substantially simpler than the general proof that a subsystem does not in any way violate security policy. Subsystems S1 and S2 process special privilege only to the degree that they are allowed access to information of formats F2 and F3. Any access which they make will also be constrained by the security levels of the information which is in the respective formats, as shown in FIG. 1. A malicious program which is not part of subsystem S1 will not be able to access information of format F2 and will thereby be prevented from altering the definition of what information must be marked in what manner, or the nature of the markings. A malicious program which is not part of subsystem S1 will not be able to produce or modify information of format F3, and will therefore be prevented from causing the display of improperly marked data.

It will further be clear that this method of restricting access on the basis of predetermined relations between data format and subsystems can be used to maintain the incorruptability of information in circumstances other than those shown in the example.

Figure 2:
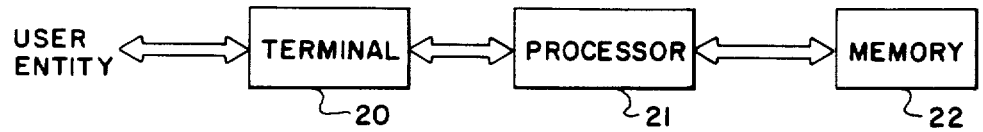
FIG. 2 is a simplified block diagram of a typical data processing system.

Referring now to FIG. 2, a data processing system is seen to be comprised of a terminal 20, a processor 21, and a memory 22. A user entity desirous having a program executed on its behalf by processor 21 must first identify itself by means of an elaborate login procedure using, for example, a password. A further example involves the use of the terminal, wherein the identity of the terminal will automatically identify the user entity and define the security attributes of said user entity. Once the user entity (or terminal) has been coupled to processor 21, said processor may execute programs on behalf of said user entity, which programs may access or manipulate information in memory 22 in a variety of modes and manners.

Figure 3:
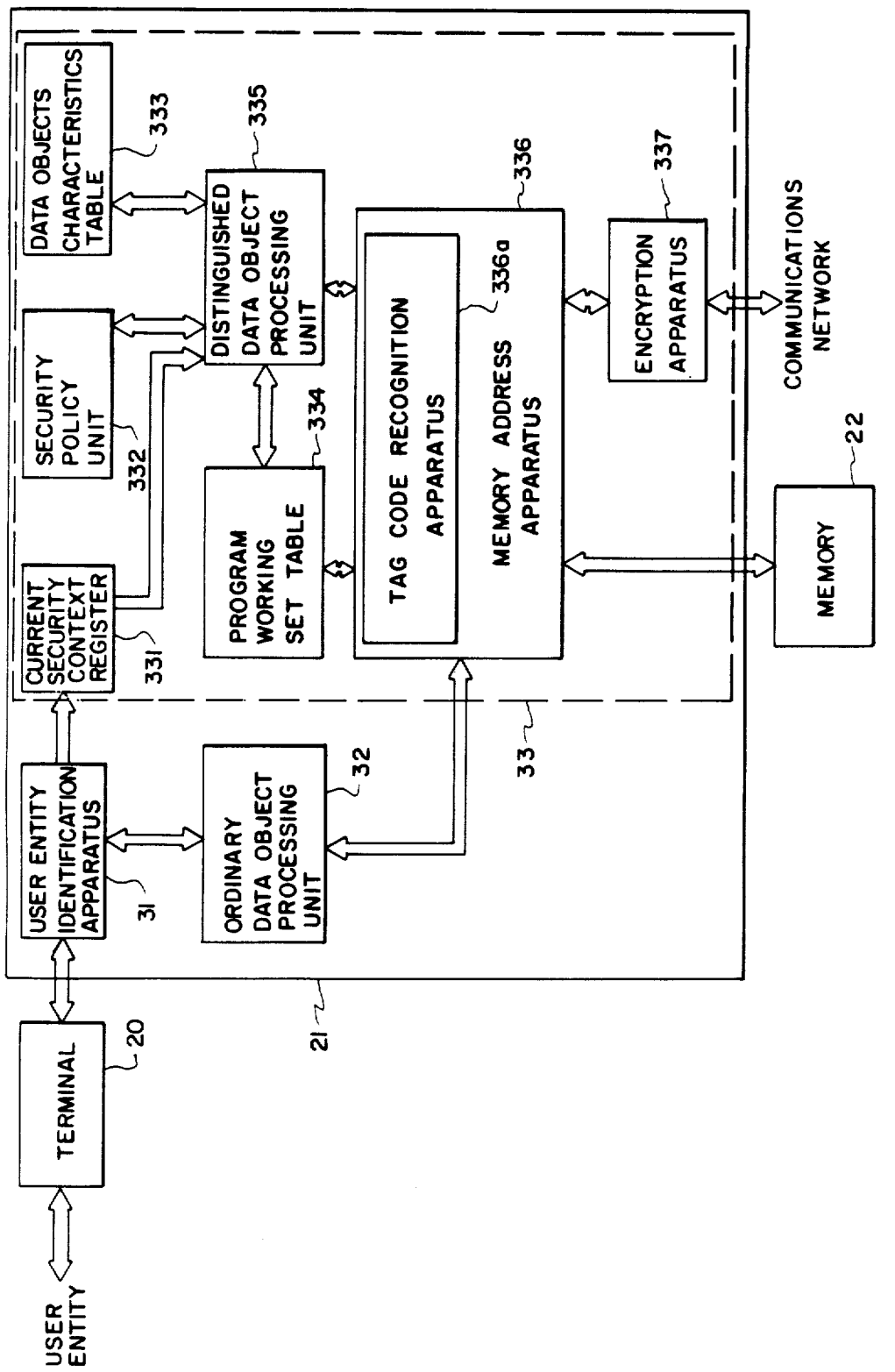
FIG. 3 is a block diagram of a data processing system illustrating the apparatus implementing the instant invention.

Referring now to FIG. 3, a schematic diagram of the principal components implementing the present invention is illustrated. Processor 21 of FIG. 2 is composed of user entity identification apparatus 31, ordinary data object processing unit 32, and secure processor 33. User entity identification apparatus 31 maintains security context register 331 by monitoring the security attributes currently associated with the user entity who is communicating through terminal 20 of FIG. 2, and by monitoring the subsystem which is currently being executed by ordinary data processing unit 32. Secure processor 33 is composed of current security context register 331, security policy unit 332, which stores the security policy and computes the allowed access modes for a user entity operating on an ordinary data object, data object characteristics table 333, which carries the address and other characteristics of every data object denoted by a distinguished data object. Secure processor 33 also includes program working set table 334, which contains the information necessary for a program to address those ordinary data objects upon which it is currently working, and distinguished data object processing unit 335, which performs the restricted set of operations on distinguished data objects. Secure processor 33 also includes memory address apparatus 336, which fetches information from and stores information into memory 22 of FIG. 2 and which includes tag code recognition apparatus 336a, which apparatus insures that ordinary data processing unit 32 only purposes ordinary data objects. The final component of secure processor 33 is encryption apparatus 337, which may be included to ensure the secure transmission of segments containing distinguished data objects.

Secure processor 33 may be accessed, and data therein manipulated, only by a director entity of the data processing system (such as a security officer). FIG. 3 depicts secure processor 33 as a distinct unit. However, the functions of secure processor 33 could be distributed throughout the hardware and software of the data processing system (e.g., they could be implemented in a general purpose processing system by software operating in specific modes).

Figure 4:
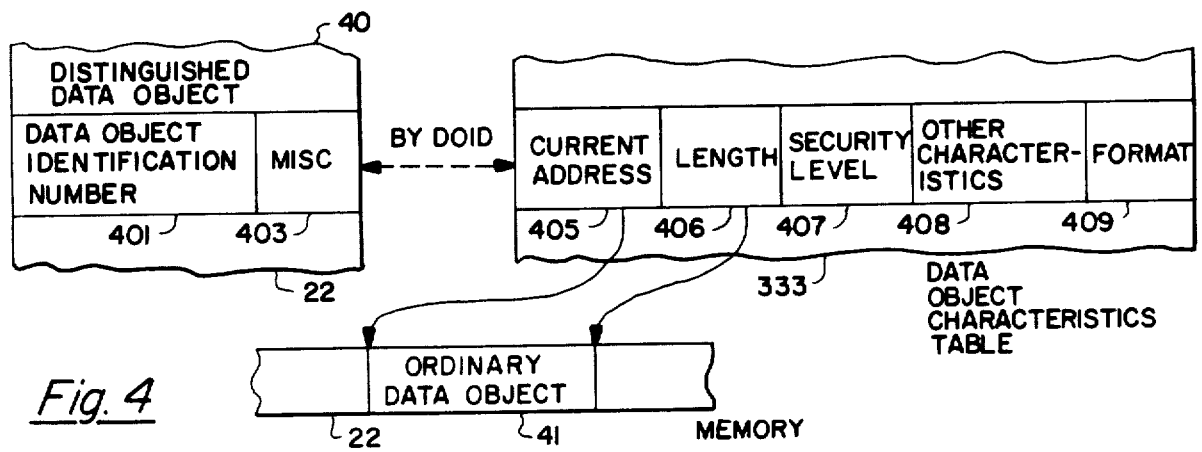
FIG. 4 is a diagram illustrating the fields of a distinguished data object.

Referring to FIG. 4, a distinguished data object is shown along with the ordinary data object it denotes. Distinguished data object 40 is composed of data object identification number 401, which uniquely identifies the ordinary data object 41, miscellaneous field 403, which may be used to contain information such as error checking and correcting codes, current address 405, which locates the beginning of ordinary data object 41 within memory 22 of FIG. 2, length 406, which defines the extent of and thus locates the end of ordinary data object 41 within memory 22 of FIG. 2, security level 407, which defines the security level of the information in ordinary data object 41, format 409, which defines the format of the information in ordinary data object 41, and other characteristics field 408, which contains other characteristics of ordinary data object 41, such as the manner in which information is encoded in it. In the preferred embodiment, fields 401 and 403 occupy contiguous locations in memory 22 of FIG. 2 and have tag codes associated with the physical media containing those locations, and fields 405, 406, and 407 are carried within data object characteristics table 333 of FIG. 3 and located by means of data object identification number 401. This organization yields the most efficient use of memory and increases the performance of the secure processor. Other organizations can be functionally equivalent, provided said organization permits fields 403, 405, 406, 407, 408 and 409 to be made available to the secure processor given a value of field 401, and provides identification to distinguish the object containing field 401 and to protect it against unauthorized access or manipulation.

Figure 5:
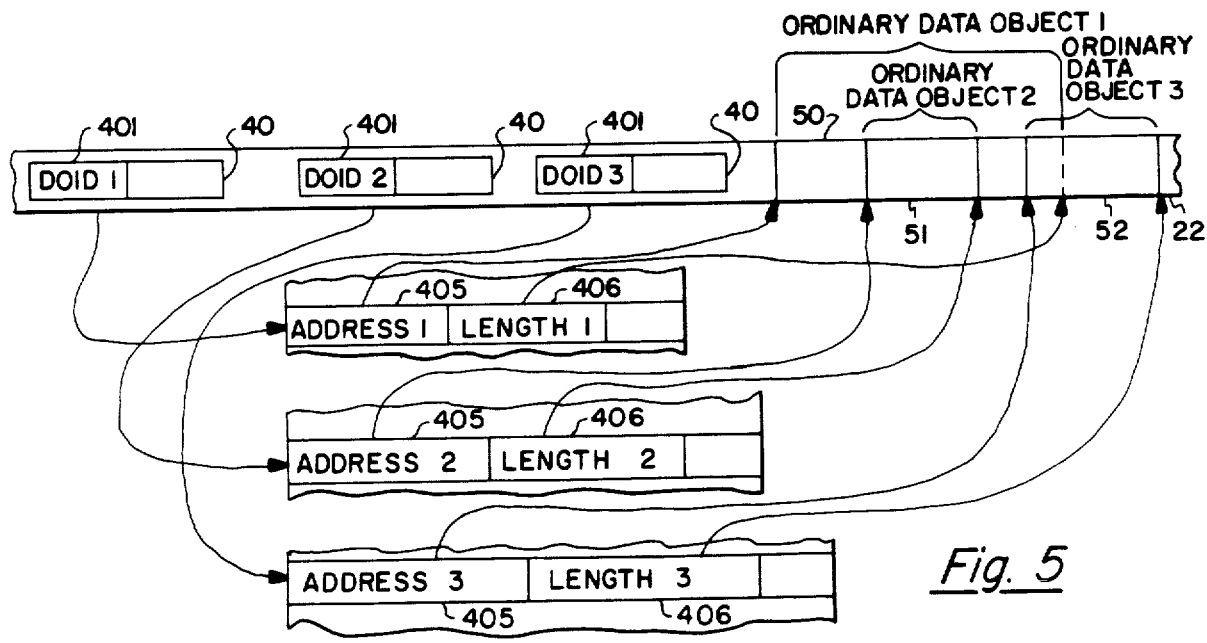
FIG. 5 is a diagram showing how distinguished data objects can denote overlapping or nested ordinary data objects.

Referring to FIG. 5, the manner in which nested and overlapping ordinary data objects can be denoted by distinguished data objects is illustrated. Three distinguished data objects 40 of FIG. 4 are shown in memory 22 of FIG. 2. Each has a distinct data object identifier value 401 of FIG. 4, and they therefore respectively denote distinct ordinary data objects 50, 51, and 52. The diagram shows how the fields 405 and 406 of FIG. 4 can assume values such that ordinary data object 51 is nested within ordinary data object 50, and ordinary data object 52 overlaps ordinary data object 50. It is also possible that the values in fields 405 and 406 assume values such that all three distinguished data objects denote the identical ordinary data object.

Figure 6:
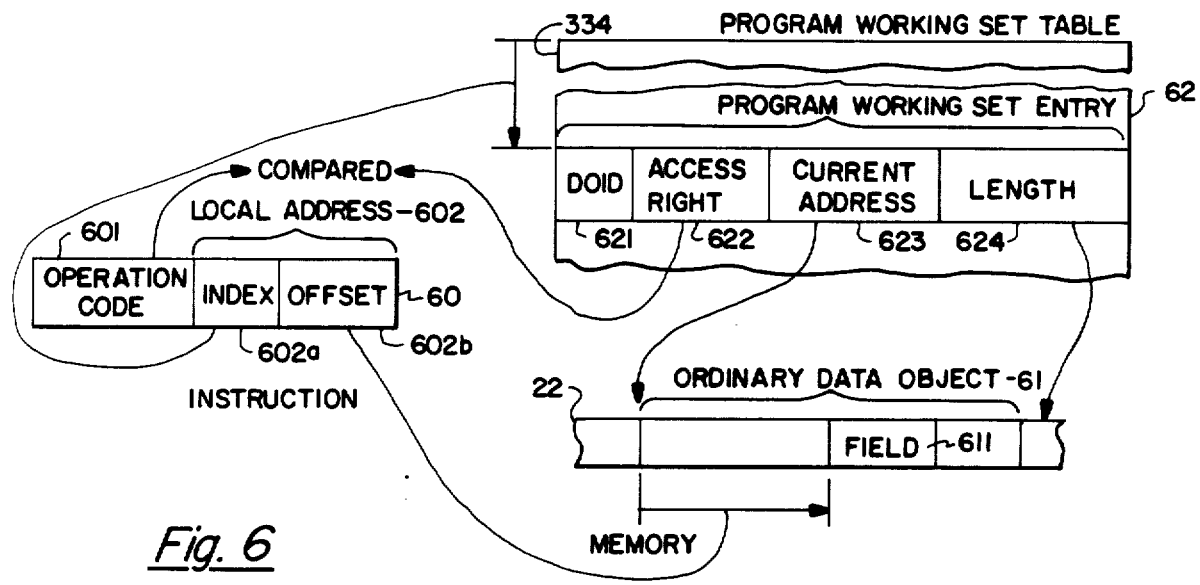
FIG. 6 is a diagram illustrating how data objects are addressed in a manner that enforces access rights.

Referring to FIG. 6, the manner in which addresses are computed and access rights checked is illustrated. An instruction 60 is composed of an operation code 601, which defines the operation a program is to perform upon field 611 of ordinary data object 61 within memory 22 of FIG. 2, and address 602, which is the location of field 611 expressed relative to the set of data objects upon which the program is currently working. Address 602 is interpreted as containing fields 602a and 602b. Field 602a is interpreted as an index into program working set table 334 of FIG. 3, which index locates program working set entry 62, which consists of data object identifier field 621, access right field 622, current address field 623, and length field 624. Field 602b is interpreted as an offset within ordinary data object 61. Instruction 60 is transmitted to memory address apparatus 336 of FIG. 3.

Memory address apparatus 336 extracts field 602a and uses it to locate program working set entry 62. Memory address apparatus 336 compares access right 622 against operation 601 and verifies that the modes and manners of access and manipulation required by operation 601 are permitted by access right 622. If they are not, memory address apparatus 336 invokes an appropriate administrative program by such means as an interrupt. If the operation 601 and access right 622 are compatible, memory address apparatus 336 then compares offset field 602b against length field 624 to verify that field 611 is indeed within ordinary data object 61. If it is not, memory address apparatus 336 invokes an appropriate administrative program by such means as an interrupt. If it is, memory address apparatus 336 adds field 602b to field 623 in order to obtain the address of field 611, and, if a read is desired, transmits field 611 to the ordinary data object processing unit 32 of FIG. 3 or distinguished data object processing unit 335 of FIG. 3, depending on operation code 601. Tag code recognition apparatus 336a of FIG. 3 checks the transfer to insure that no data stored in locations containing tag codes is transmitted to ordinary data object processor 32. It will be clear to those versed in the art how to modify this description if operation code 601 implies other mode(s) of access to field 611.

Figure 7:
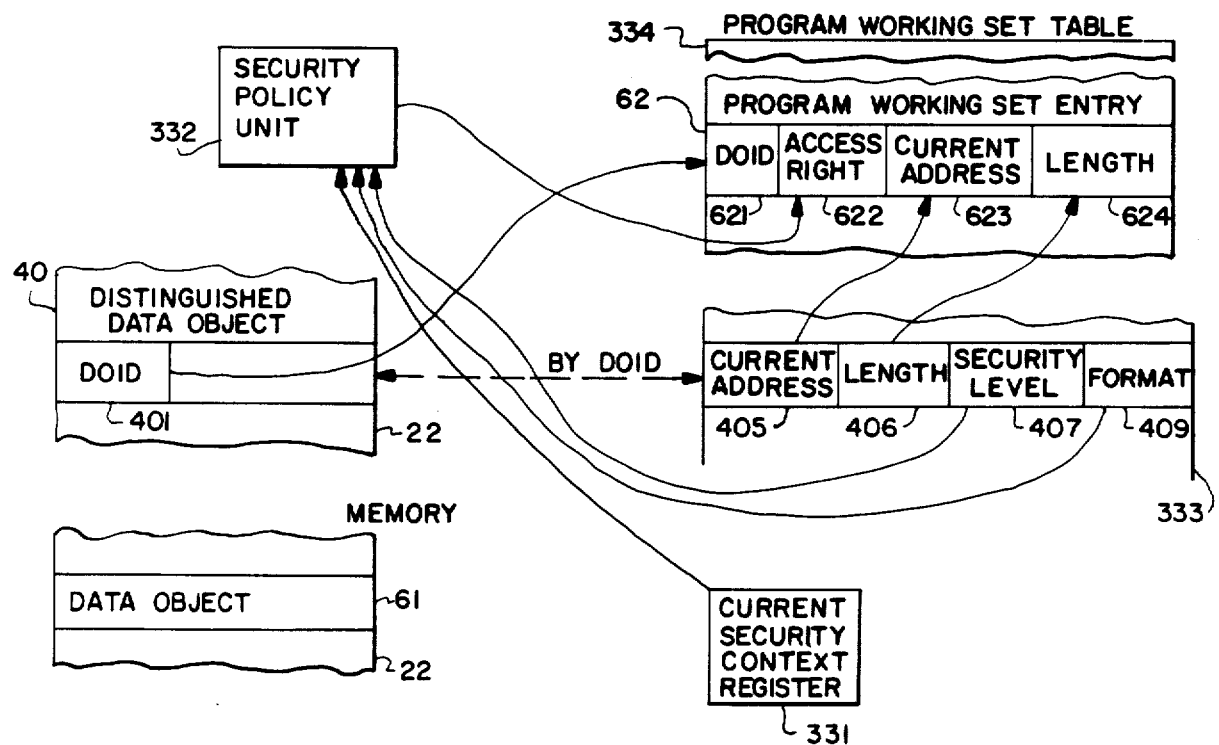
FIG. 7 is a diagram that shows how a program adds a data object to the set of data objects upon which it is working, in such a manner that the pre-existing security policy is upheld.

Referring to FIG. 7, the method by which a program adds a data object to the set upon which it is currently working is illustrated. A program transmits to secure processor 33 of FIG. 3 a request to add desired data object 61 to said program's working set, in order that desired data object 61 may be accessed or manipulated in the manner described above. The request may be encoded in any combination of operation codes, addresses, and field values which identify the request, denote a distinguished data object 40 of FIG. 4 which is contained in memory 22 of FIG. 2 and which in turn denotes the desired data object 61 in memory 22, and identify a program working set entry 62 of FIG. 6, which entry is to be used by the program for subsequent reference to data object 61. Distinguished data object processor 335 of FIG. 3 fetches fields 401 and 403 from memory 22 using the steps described in reference to FIG. 6.

Using the data object identification number 401, processor 335 fetches the security level 407 and data format 409 from data characteristics table 333, and the current security context from current security context register 331, said register 331 being continuously maintained by user entity identification apparatus 31, and sends those three values to the security policy unit 332. The security policy unit returns the correct value of access right 622 which processor 335 places in entry 62. Processor 335 constructs the remainder of entry 62 in the manner shown, by moving field 401 to field 621, field 405 to field 623, and field 406 to field 623.

It will be clear to one well-versed in the art of computer systems design that the operations depicted in FIG. 6 and those depicted in FIG. 7, operating in concert, insure that every operation of the machine is in accord with the predefined security policy. Operation 601 in FIG. 6 unavoidably encounters access right field 602 when attempting to generate an address which is required to locate field 611 in order to access or manipulate the values it contains. Access right 622 may only be set by secure processor 33 of FIG. 3. In setting these rights secure processor 33 unavoidably encounters security policy unit 332 which selects rights based on the relationship, as defined by the external policy, between the current security context in register 331 and the security level and format of the contents of field 611 carried in data characteristics table 333. Thus there exists no way of accessing or manipulating the information in field 611 except through mechanisms which enforce the external policy.

Figure 8:
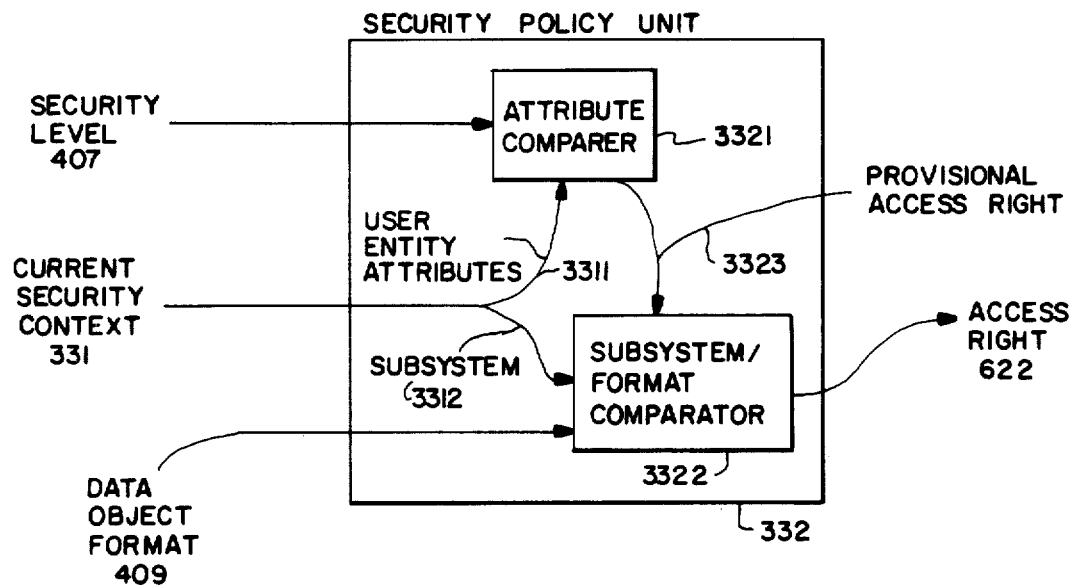
FIG. 8 is a diagram showing how access rights are computed by a security policy unit.

Referring to FIG. 8, the operation of the security policy unit 332 is shown. Current security context 331 is decomposed into its constituent parts-user entity attribute 3311 and subsystem 3312. User entity attribute 3311 and security level 407 are sent to attribute comparer 3321, which computes provisional access right 3323. The computation of provisional access right 3323 may be made by a number of means which correctly reflect the intent of the predefined policy, including but not limited to comparisions of encoded values of user entity trustworthiness and data sensitivity, and/or matching of user names with lists of authorized users. Provisional access right 3323 is then validated by subsystem/format comparer 3322, which compares current subsystem 3312 and data object format 409 against a table or other representation of allowed accesses by specific subsystems to data of specific formats. Subsystem/format comparer 3322 then deletes from provisional access right 3323 any mode or manner of access not allowed by the result of the aforementioned comparision, and produces the result as access right 622. Equivalent operation of security policy unit 332 may be obtained by performing the operations of subsystem/format comparator 3322 and attribute comparer 3321 in different order, provided that access right 622 contains no mode or manner of access denied by either the attribute comparison or the subsystem/format comparison, unless authorized in advance by an appropriate authority (e.g., a predefined program which can override the access right signal).

Access right 622 is generated only in response to attempts to add data object 61 to program working set entry 62. Therefore access right 622 need not be and is not stored other than temporarily while object 61 is included in working set table 334. Note that access right 622 cannot leave secure processor 33. This restriction is enforced by the structure of memory address apparatus 336, in which access rights signals are used to control the flow of data between memory 22 and ordinary data object processing unit 32, without sending the access rights information as data. This structure is similar to the structure of the access control portion of a contemporary memory management unit.

Storage of access right signals only while the corresponding object is included in working set table 334 simplifies the problem of revoking access once granted. If access rights could be retained by a user in any memory object, said access right signals could be used to obtain access to object 61 at a later time, even though the user may not have retained a working set table during the entire time since the access right signals were obtained.

The present invention, in effect, automatically revokes any outstanding access rights after the working set table is destroyed, which might occur when a user terminates the session with the processor, or when a new working set table is initialized, which might occur when a user initiates a session with the processor. The fact that access right 622 cannot leave secure processor 33 prevents users from circumventing the revocation rules by storing obsolete access rights in protected system files.

OPERATION OF THE PREFERRED EMBODIMENT

In the preferred embodiment, distinguished data objects are distinguished from ordinary data objects by having tag codes associated with the physical media in which, at any given instant, the distinguished data object is stored. Distinguished data objects may only be acted upon by special apparatus. Distinguished data objects may be included as fields within ordinary data objects, in which case they appear to the apparatus which processes ordinary data objects as forbidden fields.

The apparatus which recognizes and acts upon distinguished data objects is included in the data processing system as a separate secure processing unit with memory subject only to the control of the secure processing unit. Prior to accessing or manipulating an ordinary data object, a program executing on behalf of a user entity must transfer a distinguished data object to the secure processing unit, whereupon the secure processing unit extracts the current security context of the program, the security level of the ordinary data object denoted by that distinguished data object, and the format of the ordinary data object from the secure processing unit's memory. The secure processing unit then determines what access rights are consistent with the predetermined security policy and the predetermined access relations between subsystems and formats. The secure processing unit will permit the program to access or manipulate the ordinary data object denoted by the distinguished data object only in those modes and manners consistent with said predetermined policy and predetermined access relations.

Distinguished data objects are created under two circumstances. In the first circumstance, a program transmits to the secure processing unit a request that a new ordinary data object be created. The request must include the characteristics of the ordinary data object to be created, such as for example its size, the manner in which information is encoded in it, and where it should be located in the system files. The request must also include the security attributes and the format of the ordinary data object to be created. The secure processing unit places in its memory the characteristics of the ordinary data object, allocates space in an appropriate physical medium, and creates a new distinguished data object that denotes the new ordinary data object. The secure processing unit then transmits the new distinguished data object to the requesting program. In the second circumstance, a program transmits a request to the secure processing unit that a distinguished data object be copied. The request must include a distinguished data object which is to be used as an original. The secure processing unit returns the the new distinguished data object to the requesting program.

The preferred embodiment achieves security by six techniques used in concert. First, it collects all information into identifiable data objects. Second, it requires that for every operation on a data object the user process uses a distinguished data object which denotes said data object. Third, it is cognizant at all times of the security attributes of the user entity on whose behalf operations are being performed, including the identity of the subsystem in use. Fourth, it controls the manner in which distinguished data objects may be used to access data objects by associating with every data object a set of security attributes and a format. Fifth, it selects modes and manners of access at the time distinguished data objects are used by an operation, such that the operation can access or manipulate data objects only in modes or manners which are authorized by a predefined security policy. Sixth, it collects all programs into subsystems and restricts the mode and manner of access by programs to ordinary data objects by maintaining a predefined relation which defines allowed access by programs in a subsystem to data objects based on the format of said data objects.

Operation of the first technique is made clear by reference to FIG. 6. Information stored in memory 22 of FIG. 2 can only be made available to an operation 601 through local address 602. Address 602 selects, by its very nature, a field 611 within a collection of fields, said collection being data object 61. Thus all information which is accessible to an operation must be part of a data object.

Operation of the second technique is made clear by reference to FIGS. 6 and 7. A program accesses or manipulates information in a field by means of an instruction 60 of FIG. 6 whose local address 602 selects field 611. In order to perform the computation necessary to select field 611, program working set entry 62 must be fetched. Program working set entry 62 is shown in FIG. 7 to be derived from fields of distinguished data object 40 whose data object identification number 401 denotes data object 61. Thus the act of addressing a field unavoidably involves the presentation of a distinguished data object prior to the attempt to address.

Operation of the third technique is by any appropriate organization of user entity identification apparatus 31 of FIG. 3 and the communication between it and current security context register 331. Apparatus 31, in conjunction with terminal 20 of FIG. 2, can use any of a variety of means, such as passwords, secure and dedicated telephone lines, callback, cryptographic seals, and others, singly and in combination, in order to determine what set of attributes to place initially in register 331. At the same time, program working set table 334 is initialized by loading a set of entries 62 with access rights compatible with the contents of security context register 331. During program execution, the operation code 601, in conjunction with address 602, may request a change from one subsystem to another subsystem, which then causes a different program working set table 334 to be used in accessing field 611.

Operation of the fourth technique can be made clear by reference to FIG. 4, in which it can be seen that security level field 407 and format field 409 are associated with the same data object identification number 401 which selects the current address of ordinary data object 41.

Operation of the fifth technique is made clear by reference to FIG. 7. Use of a distinguished data object involves its being fetched by distinguished data object processing unit 335 of FIG. 3, and fields being moved from it to the program working set entry 62. Once fetched, data object identifier 401 is available to obtain security level 407 from data object characteristics table 333 of FIG. 3. Current security context is always available to processing unit 335 by its accessing current security context register 331 of FIG. 3. Hence the use of a distinguished data object unavoidably involves the comparison of data object security level with current security context, and hence the proper setting of access right field 622 of FIG. 6 by security policy unit 332 of FIG. 3. Once set, access right field 622 is unavoidably encountered by an operation seeking current address field 623 of FIG. 6 in order to access field 611 of FIG. 6. The restriction in modes and manners of access is therefore uniformly enforced.

Operation of the sixth technique can be made clear by reference to FIG. 8. In the calculation of access right 622, of FIG. 6, data object format 409 of FIG. 4 and the subsystem component 3312 of the current security context register 331 of FIG. 3 are compared by the subsystem/format comparer 3322 and the results of this comparison used to insure that all modes and manners of access granted by access right 622 are consistent with a predefined set of access rights allowed by programs in subsystems to data of specific formats. By reference to FIG. 6 it can be seen that access right field 622 is unavoidably encountered by operation 601 of any program in the course of forming the current address 623 of field 611 to be operated upon. Thus the access right restrictions imposed by subsystem/format comparer 3322 of FIG. 8 are uniformly enforced.

The mechanisms and techniques of this invention can be embodied in a variety of ways, including, but not limited to, the following two system configurations. These possible embodiments can be understood with reference to FIG. 3. In the first embodiment, the functions of the ordinary data object processing unit 32 are performed by a conventional processing unit, such as a microprocessor which provides signals concerning the types of access being requested in a memory access request. The functions of the memory address apparatus 336 are performed by a hardware module positioned between the ordinary data object processing unit 32 and the bus which connects the processor to memory units 22. The program working set table would be contained either within the module performing the functions of the memory address apparatus 336 or in a memory unit easily accessible from that unit, said memory unit being protected against attempts to access its contents from the ordinary data processor 32. The functions of the distinguished data object processing unit 335 could be implemented in a special hardware module attached to the memory bus or attached by means of a dedicated connection to the memory address apparatus 336. The memory units 22 would be modified to include tags associated with each addressible entity, and to communicate said tag values along with the contents of the addressible entities on the bus. The memory address apparatus would examine the value of the tag field associated with incoming data, and would control the flow of such information so as to guarantee that the ordinary data object processing unit 32 is never sent the contents of any object whose tag value indicates that it is contained within a distinguished data object.

In the second embodiment, the functions of the ordinary data object processing unit 32 are performed by a conventional processor, such as a minicomputer, and the functions of the distinguished data object processing unit 335 are performed by a suitably programmed microprocessor. The memory address apparatus could be implemented as described above for the first embodiment. It is readily seen by persons experienced in the art of computer systems design that other embodiments are possible, including one in which all operations are performed in the same processing unit, with the tag values of the operands serving to limit the functions which can be performed on those operands.

In either embodiment, the tag fields and therefore the distinction between ordinary and distinguished data objects may be omitted. In the resulting embodiment, any data object of the proper size may be submitted to distinguished data object processing unit 335 and interpreted by said unit as a data object identification number 401 of FIG. 4. It is clear to anyone well-versed in the art of computer systems design that while such an embodiment may produce unanticipated results for operations, all such results will be consistent with the predefined security policy and the predefined set of accesses allowed by subsystems to information of specific formats.

If the distinction between ordinary and distinguished data objects is maintained through tagging, then distinguished data objects may be written more freely than ordinary data objects. In particular, it would be possible to permit distinguished data objects to be copied (which is a form of writing) into ordinary data objects in certain circumstances under which the copying of ordinary information would be forbidden by the preexisting policy, in such a manner that visible information flows do not violate the preexisting policy. Allowing such operations permits a greater degree of freedom in the design of programs without compromising security.

It should be clear to one well-versed in the art of computer system design that the present invention, though described above for a processor having a single user terminal, can be effectively adapted to create a computer system having a multiplicity of user terminals. As is known in related art, processors can be switched among programs associated with different users providing that state information regarding a user's program is saved when the program is switched out and reliably restored when the program is switched back in to the processor. Adapting the above technique to the present invention requires that the state of a user program include the contents of the current security context register 331 of FIG. 3 and the contents of the program working set table 334 of FIG. 3.

It should also be clear to one well-versed in the art of computer system design that the operation of setting access right 622 may be performed at any time prior to performing operation 601. In general, the later it is performed the more often it is performed. The more often it is performed, the longer the machine will take to execute a program comprised of sets of operations 601. The more often it is performed, the more frequently data characteristics table 333 will be consulted, and hence the more rapidly that changes to that table will be reflected in the restrictions imposed on the behavior of programs. There accordingly exist a range of embodiments of this invention in which different tradeoffs are made between the performance of programs and the timeliness of the data security characteristics which controls the accesses made by those programs. A common case in which data access characteristics change is when the access granted to a user by name is granted or revoked. If access right 622 is recomputed for each operation 601, then the grant or revocation will be effective on the very next operation. If access right 622 is recomputed at some greater interval, then some number of operations 601 may execute under the control of an obsolete value of field 622.

Many changes and modifications in the above-described embodiments of the invention can, of course, be carried out without departing from the scope thereof. Accordingly, the scope of the invention is to be limited only by the scope of the accompanying claims.

What is claimed is:

1. A data processing system having protected system files, wherein each protected system file is associated with a data format and wherein said data processing system operates in response to programs or groups of programs which perform specific tasks, comprising:
identification means for identifying a user interacting with said data processing system, said identification means relating preselected security attributes with said user; and
secure processor, connected to said identification means, for storing, at least temporarily, a security policy and for processing data in accordance with said security policy, said security policy defining permissible access rights to said protected system files in terms of possible values of data formats, possible values of said preselected security attributes and functions of said specific tasks, wherein data stored in said secure processor can be altered only by a director entity of said data processing system and retrieved only by portions of said secure processor, said secure processor having generating means for generating an access rights signal for any one of said protected system files, said access rights signal being determined by a comparison of said security policy to said predetermined security attributes, said data format associated with said any one of said protected system files and any functions to be performed with or upon said any one of said protected system files.

2. The data processing system of claim 1 further comprising:
determining means, connected to said generating means, for determining permissible access to said any one of said protected system files each time a function attempts to access said any one of said protected system files by comparing said access rights signal to said function.

3. The data processing system of claim 2 further comprising:
overriding means, connected to said determining means, for overriding said access right signal in response to selected of said programs or groups of programs.

4. The data processing system of claim 2 wherein:
each of said protected system files is associated with a security level;
said security policy further defines permissible access rights to said protected system files in terms of possible values of security levels; and
said access rights generating means includes a comparison of said security policy to the security level associated with said any one of said protected system files.

5. The data processing system of claim 4 wherein said specific tasks include:
outputting said protected system files, and labeling said protected system files when said protected system files are output.

6. A data processing system having protected system files, wherein each protected system file is associated with a security level and wherein said data processing system attempts to perform operations with or upon said protected files in response to programs or groups of programs, comprising:
identification means for identifying a user, said identification means relating preselected security attributes with said user;
secure processor, connected to said identification means, for storing, at least temporarily, a security policy and for processing data in accordance with said security policy in response to said programs, said security policy defining permissible access rights to said protected system files in terms of possible values of said preselected security attributes and possible values of security levels, wherein data stored in said secure processor can be altered only by a director entity of said data processing system and retrieved only by portions of said secure processor, said secure processor having generating means for generating an access rights signal for any one of said protected system files, said access rights signal being determined by a comparison of said security policy to said preselected security attributes and the security level associated with said any one of said protected system files, and said secure processor having prohibiting means, connected to said generating means, for prohibiting said access rights signal from exiting said secure processor; and
storage means, connected to said secure processor, for storing said protected system files, access to protected system storage means being controlled by said secure processor.

7. The data processing system of claim 6 wherein:
said protected system files are further associated with a data format;
said program or groups of programs perform specific tasks;
said security policy further defines permissible formats of said protected system files in terms of possible values of data formats, possible values of said preselected security attributes and functions of said specific tasks; and
said access rights generating means includes a security attribute comparator and a format comparator, wherein said security attribute comparator compares said security policy to said security level associated with said any one of said protected system files and said preselected security attributes, and said format comparator compares said security policy to a data format associated with said any one of said protected system files and any functions to be performed with or upon said any one of said protected system files.

8. The data processing system of claim 7 further comprising:
   determining means, connected to said generating means, for determining permissible access to said any one of said protected system files each time a function attempts to access said any one of said protected system files by comparing said access rights signal to said function.

9. The data processing system of claim 8 further comprising:
   overriding means, connected to said determining means, for overriding said access right signal in response to selected of said programs or groups of programs.

10. The data processing system of claim 7 wherein:
    one and only one of said security attribute comparator or said format comparator generates a provisional access rights signal, with another of said security attribute comparator or said format comparator receiving and deleting from said provisional access rights signal any access right not permitted by a comparison with said security policy made in another comparator, so that said access rights signal is generated.

11. A method of protecting system files in a data processing system, wherein each system file to be protected is associated with a security level and wherein said data processing system attempts to perform operations with or upon protected system files in response to programs or groups of programs, comprising:
    identifying a user, an identification relating preselected security attributes with said user;
    storing, at least temporarily, a security policy in a secure processor, said security policy defining permissible access rights for protected system files in terms of possible values of said preselected security attributes and possible values of security levels, and wherein data stored in said secure processor can be altered only by a director entity of said data processing system and retrieved only by portions of said secure processor;
    processing protected system files in accordance with said security policy; and
    generating an access right signal for any one of protected system files, said access rights signal being determined by a comparison of said security policy to said preselected attributes and security level associated with said any one of protected system files, an access rights signal generating means being a portion of said secure processor; and
    prohibiting said access rights signal from exiting said secure processor.

12. The method of claim 11 further including:
    determining permissible access to said any one of protected system files each time an operation attempts to access said any one of protected system files by comparing said access rights signal to said operation.

13. The method of claim 12 further including:
    overriding said access right signal in response to selected of said programs or groups of programs.

14. A method of protecting system files in a data processing system, wherein each system file to be protected is associated with a data format and wherein said data processing system operates in response to programs or groups of programs which perform specific tasks, comprising:
    identifying a user interacting with said data processing system, an identification relating preselected security attributes with said user;
    storing, at least temporarily, a security policy in a secure processor, said security policy defining permissible access rights to protected system files as a function of possible values of data formats, possible values of said preselected security attributes and functions of specific tasks, wherein data stored in said secure processor can be altered only by a director entity of said data processing system and retrieved only by portions of said secure processor;
    processing protected system files ind said secure processor in accordance with said security policy; and
    generating an access rights signal for any one of protected system files, said access rights signal being determined by a comparison of said security policy to said preselected security attributes, said data format associated with said any one of protected system files and any function to be performed with or upon said any one of protected system files.

15. The method of claim 14, further including:
    determining permissible access to said any one of protected system files each time a function attempts to access said any one of protected system files by comparing said access rights signal to said function.

16. The method of claim 15 further including:
    overriding said access right signal in response to selected of said programs or group of programs.

17. The method of claim 15 wherein:
    said security policy further defines permissible access rights of protected system files in terms of possible values of security levels; and said generating includes a comparison of said security policy to a security level associated with
    said any one of protected system files in determining said access rights signal.

* * * * *